No. 887,551. PATENTED MAY 12, 1908.
H. M. VANDERBILT.
VEHICLE BRAKE.
APPLICATION FILED AUG. 1, 1906.

WITNESSES

INVENTOR
Herbert M. Vanderbilt
BY
ATTORNEYS

UNITED STATES PATENT OFFICE.

HERBERT M. VANDERBILT, OF SUFFERN, NEW YORK.

VEHICLE-BRAKE.

No. 887,551.  Specification of Letters Patent.  Patented May 12, 1908.

Application filed August 1, 1906. Serial No. 328,753.

*To all whom it may concern:*

Be it known that I, HERBERT M. VANDERBILT, a citizen of the United States, and a resident of Suffern, in the county of Rockland and State of New York, have invented a new and Improved Vehicle-Brake, of which the following is a full, clear, and exact description.

This invention is an improved vehicle brake designed to be used primarily as an emergency braking means for motor vehicles, especially avoiding undue wear of the tires.

With this in view the invention consists of a clamping shoe attached to a flexible band or other connection adapted to be drawn under the wheel of the vehicle when the shoe is thrown into engagement with the vehicle tire. Suitable means are also provided to automatically draw the band and shoe to a normal or inoperative position after the braking action has been accomplished and the vehicle backed to release them.

Reference is to be had to the accompanying drawings forming a part of this specification, in which similar characters of reference indicate corresponding parts in all the figures.

Figure 1:
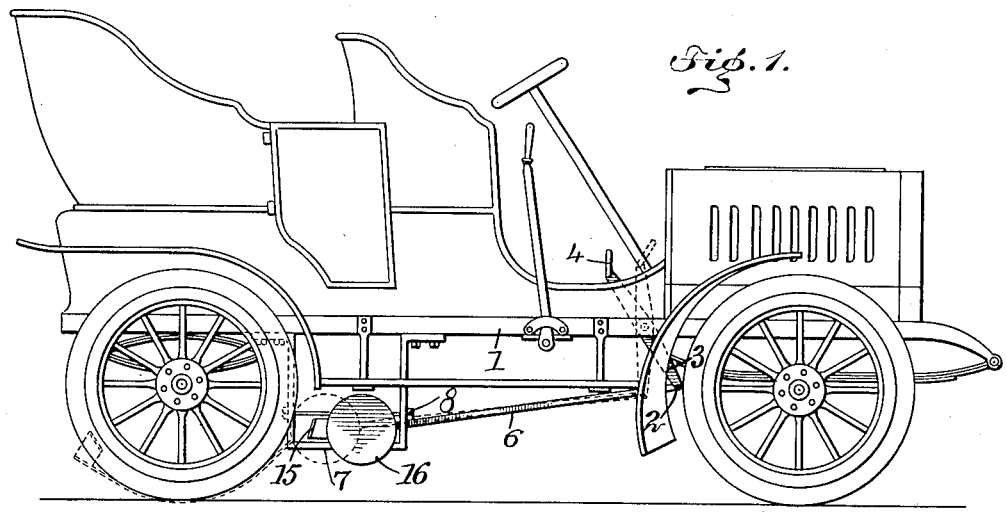
Figure 2:
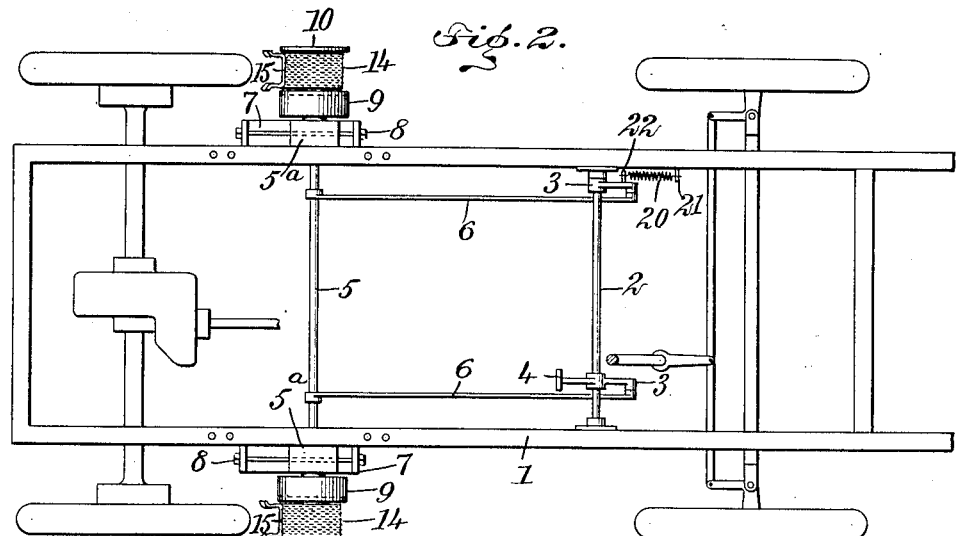
Figure 3:
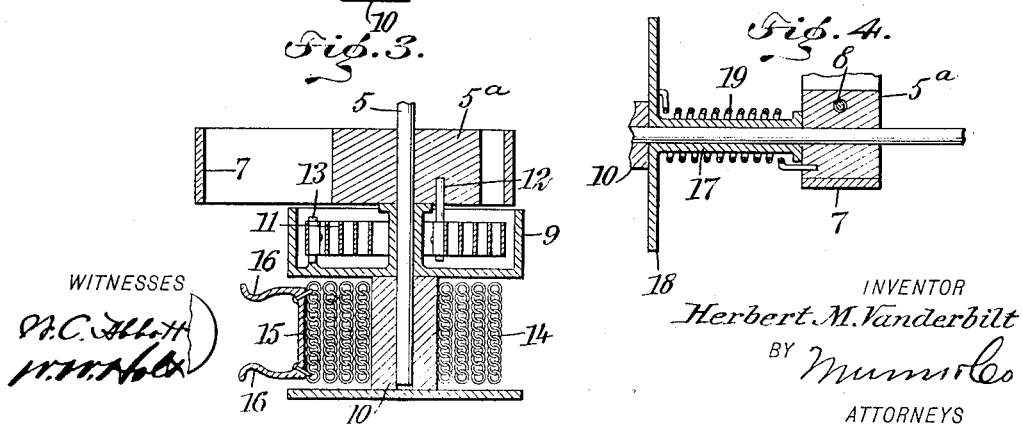

Figure 1 is a side elevation of a motor vehicle with my improved brake applied thereto; Fig. 2 is a plan view of the frame of the vehicle, better illustrating the brake arrangement; Fig. 3 is a central, horizontal, sectional view through one of the brake shoes and the adjacent mechanism, and Fig. 4 is a modified form of spring arrangement for returning the shoe and flexible connection to normal or inoperative position.

Referring to the drawing figures, the numeral 1 indicates a motor vehicle having journaled transversely in the forward part of its frame a shaft 2, near each end of which are fixed crank arms 3, one of said arms being extended at the opposite side of the shaft and formed into a foot lever 4. A shaft 5 is journaled in blocks 5ª some distance in the rear of the shaft 2 and is connected to the crank arms 3 attached thereto, by means of suitable links 6. The blocks 5ª which guide the brake are slidably supported in brackets 7 arranged at the sides of the vehicle, and are pierced by rods 8 passing through said brackets, acting to keep them from transverse movement and compelling the guide blocks to travel in a straight line when the foot lever 4 is moved.

Fixed to each end of the shaft 5 extending beyond the guide blocks 5ª is a spring casing 9 adjacent to said blocks, and a drum 10 at the outside of and adjacent to the casing. The casing 9 as shown, is open at the side adjacent to the blocks and is connected therewith by means of a flat spiral spring 11 contained in the casing, the inner end of said spring being attached to a pin 12 extending from the guide block and the outer end of said spring being attached to a pin 13 extending from one side of the casing. On the drum 10, which, as stated, is fixed to the outer end of the shaft 5, has fixed to it one end of a chain belt or other flexible connection 14 which is wound thereabout, the belt having fixed to its outer end a clamping shoe 15, best shown in section in Fig. 3, and the clamping shoe being provided with spring clamping jaws 16 at its sides, forming a pocket slightly contracted at its mouth.

Figure 4:
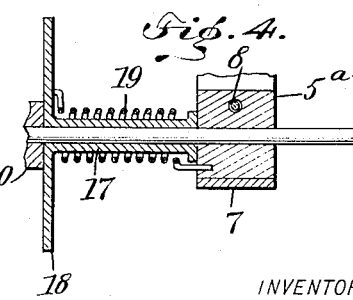

In Fig. 4 is shown a mechanical equivalent for the construction of the spiral spring and its casing shown in Fig. 3. This consists of an elongated collar 17 flanged at one side adjacent to the drum 10, as at 18, and having wound thereabout a spiral spring 19, one end of which is fixed to the flange of the collar and the opposite end to the adjacent guide block 5ª in a well-known manner.

The operation of the brake is as follows: When desired to make an emergency stop when the vehicle is in motion forwardly, the foot lever 4 is pressed and pushed to the dotted position shown in Fig. 1. This acts to slide the guide blocks 5ª rearwardly through the action of the intermediate links 6 connected to the crank arms 3 and shaft 5. The guide-blocks 5ª on moving rearwardly, carry with them the attached mechanism at the extreme ends of the shaft 5 and force the clamping shoes 16 into embrace with the rear tires, which by virtue of their movement, act to draw said shoes underneath the rear wheels, pulling the chain belts 14 against the tension of the springs 11 with them and acting to slide the wheels.

When the motor vehicle is brought to a standstill, it is backed off the belts and shoes, which, when disengaged, will be automatically re-wound to normal or inoperative position by reason of the tension of the springs 11. Any suitable means may be provided for returning the guide blocks 5ª and attached mechanism forwardly, thus carrying the foot lever 4 to its first position. For accomplishing this I have shown a spring 20 having one end attached to a pin 21 fixed to the frame of the machine and its opposite end attached to a pin 22 extending from the adjacent crank arm 3. It is evident, however, that the position of this spring may be variously changed.

Although I have described the invention in detail in order that the construction and operation might be fully understood, the precise embodiment is not material provided its essential characteristics are employed, as pointed out in the annexed claims.

Having thus described my invention I claim as new and desire to secure by Letters Patent:

1. In a vehicle brake, clamping means adapted to engage the wheel of the vehicle when thrown in contact therewith, means attached to said clamping means designed to be drawn under the wheel when said clamping means and wheel are engaged, means for automatically returning said clamping means and the means attached thereto to an elevated position when the wheel is backed off of said last-named means, and means then operating to automatically withdraw all of said means from the wheel.

2. In a vehicle brake, a drum, a flexible connection wound thereabout, a shoe attached to said flexible connection adapted to clamp the wheel of the vehicle when thrown in contact therewith acting to draw said flexible connection under the wheel, means for automatically rewinding the flexible connection on the drum and returning the shoe when the wheel is backed off and means for automatically withdrawing the drum and parts carried thereby from the wheel.

3. In a vehicle brake, a shaft, guiding means for said shaft, a drum attached to each end of the shaft, a flexible connection carried by each drum, a clamping shoe carried by each flexible connection, and means for moving said shaft to engage said shoe with the wheels of the vehicle, acting to draw the flexible connections thereunder as described.

4. In a vehicle brake, clamping means for clamping the wheel of the vehicle, means attached to said clamping means adapted to be drawn under the wheel when said clamping means and wheel are engaged, means for automatically returning said clamping means to inoperative position when disengaged, and means for reciprocating said clamping means.

5. In a vehicle brake, a shaft, guiding means for said shaft, a flexible connection adapted to be wound about said shaft, a clamping shoe carried by the flexible connection, a lever for moving the clamping shoe to engage the wheel of the vehicle, acting to draw the flexible connection thereunder, means for automatically winding up the flexible connection and shoe when released from the wheel, and means for automatically returning the lever and shoe to initial position.

In testimony whereof I have signed my name to this specification in the presence of two subscribing witnesses.

HERBERT M. VANDERBILT.

Witnesses:
W. W. HOLT,
JNO. M. RITTER.